United States Patent [19]

Eggenberger et al.

[11] Patent Number: 4,998,816
[45] Date of Patent: Mar. 12, 1991

[54] ATTACHMENT FOR SPECTACLES

[76] Inventors: Jean-Albert Eggenberger; Edith Eggenberger, both of P.O. Box 604, Fort Langley, British Columbia V0X 1J0, Canada

[21] Appl. No.: 446,481

[22] Filed: Dec. 5, 1989

Related U.S. Application Data

[63] Continuation-in-part of Ser. No. 308,321, Feb. 8, 1989, abandoned.

[51] Int. Cl.⁵ .............................................. G02C 3/02
[52] U.S. Cl. .................................... 351/156; 351/123; 351/157
[58] Field of Search ....................... 351/123, 156, 157; 2/13, 452; 24/3 C

[56] References Cited

U.S. PATENT DOCUMENTS 4,515,449  5/1985  Davidson ........................... 351/157

Primary Examiner—Rodney B. Bovernick
Attorney, Agent, or Firm—Christie, Parker & Hale

[57] ABSTRACT

An attachment to assist in holding spectacles on the head of a wearer. The attachment has at least one anchor member to grip the ear pieces of the spectacles and a retaining member, usually a cord, extends from the anchor member or members. A neck band is received around the neck of the wearer and the retaining member is attached to the neck band. One embodiment includes a head strap that extends secure behind the head of a wearer. A further embodiment has a single anchor member to grip both ear pieces and also to act as a head strap.

11 Claims, 2 Drawing Sheets

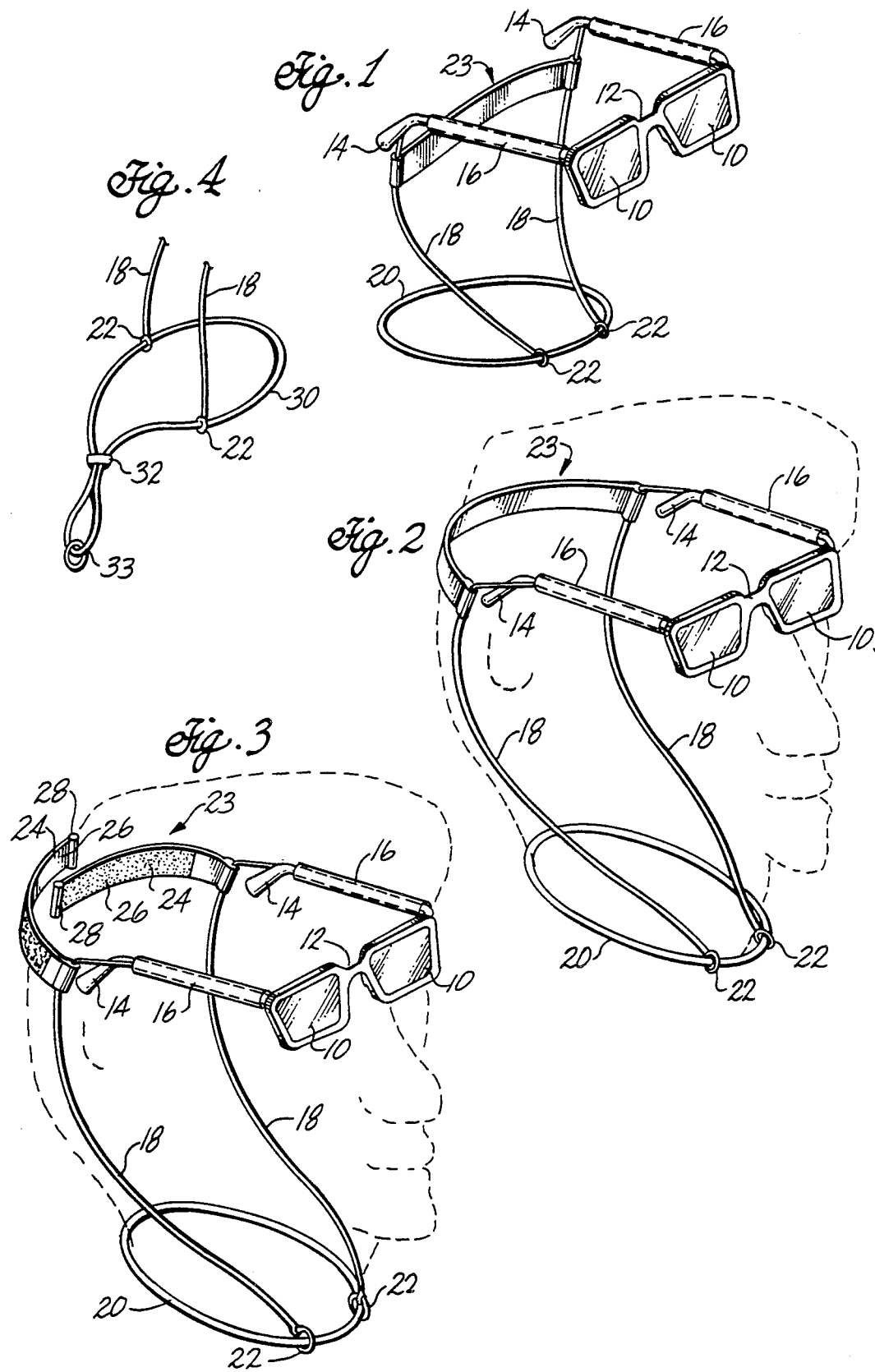

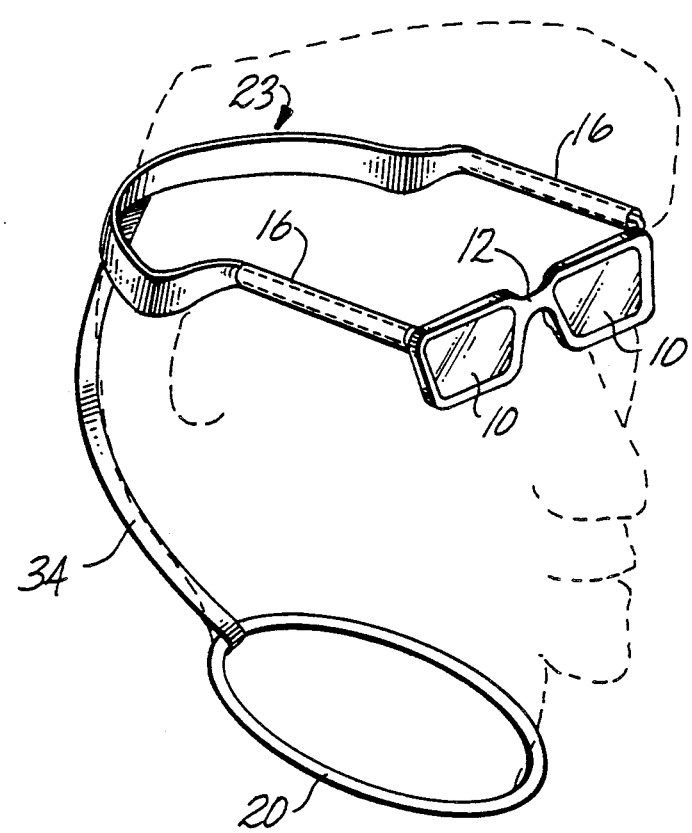

ATTACHMENT FOR SPECTACLES

FIELD OF THE INVENTION

This invention relates to an attachment to assist in holding spectacles on the head of a wearer. The attachment is predominantly useful in sports, particularly vigorous sports.

DESCRIPTION OF THE PRIOR ART

Spectacles can be lost relatively easily. For many years they have comprised eye pieces, joined by a nose piece, with ear pieces extending from the outer edges of the eye piece. Particularly when looking downwardly or when the wearer is pushed the glasses can be displaced.

The loss of spectacles in this way can be a problem. Many people need glasses to see properly. Furthermore spectacles are expensive and if broken, or lost because they have fallen from some height or into water, there is considerable inconvenience.

The problem is compounded in the case of sports. Clearly it is more likely that a person would be knocked in sports and necessary eye glasses will be displaced. In sports such as surfing and skiing it is common to wear sun glasses and the problem is therefore extended to people who would not normally wear corrective eye glasses but merely wear the glasses to prevent damage to the eyes from sunlight.

It is well known to attach cords to the ear pieces of the glasses extending loosely around the head. This prevents the loss of the glasses if they are inadvertently knocked from the wearer's head but also allows a wearer to remove the glasses temporarily when the glasses are not needed, for example in the case of reading glasses. However, the main purpose is to prevent the loss of the glasses when they are dislodged from the wearer's head.

Such attachments are commonly used in sports but they are not wholly satisfactory in those circumstances. Although it is a great advantage that the glasses are not lost when dislodged it is preferable that the glasses not be dislodged.

SUMMARY OF THE INVENTION

The present invention provides an improved means of holding spectacles on the head of a wearer.

In its broadest aspect the present invention is an attachment to assist in holding spectacles on the head of a wearer, the spectacles having eye pieces and ear pieces, the attachment comprising:
at least one anchor member to grip the ear pieces of the spectacles;
a retaining member extending from said at least one anchor member;
a neck band to be received around the neck of the wearer; and
means attaching the retaining member to the neck band.

In one embodiment there are anchor members to grip each ear pieces of the spectacles and a retaining member extends from each anchor member.

In this embodiment the attachment preferably includes a head strap extending between the retaining members to secure behind the head of a wearer. The head strap is desirably formed in two parts, one part extending from each retaining member, and being joinable at their distal ends.

In a further embodiment there is one anchor member to grip both the ear pieces of the spectacles and thus also act as a head strap. A single retaining member extends from the anchor member to the neck band.

BRIEF DESCRIPTION OF THE DRAWINGS

Aspects of the invention are illustrated in the accompanying drawings, in which:

FIG. 1 is a perspective view of a first embodiment of the present invention;

FIG. 2 illustrates the attachment in FIG. 1 in place, holding spectacles on the head of a wearer;

FIG. 3 illustrates the placing of the attachment on the head of a wearer;

FIG. 4 shows a variation of the invention; and

FIG. 5 is a perspective view of a second embodiment of the present invention.

DESCRIPTION OF THE PREFERRED EMBODIMENTS

The drawings show an attachment to assist in holding spectacles on the head of a wearer. In FIGS. 1 to 4 spectacles have eye pieces 10, joined at 12, and ear pieces 14. The attachment comprises anchor members 16 to grip the ear pieces 14 of the spectacles. In the illustrated embodiment the anchors 16 are elasticated sleeves that grip the ear pieces 14. A retaining member in the form of cord 18 is attached to each anchor member 16, or may be formed integrally with each anchor member 16, and extends from the anchor member. There is a neck band 20 to be received around the neck of the wearer and simple loops 22 are attached to the ends of the cords 18 to fit around the neck band 20. Cords 18 may be elastic so that the attachment can fit a number of sizes.

The neck band 20 is desirably of variable length and is therefore preferably elastic. This means one neck band can be used to fit a variety of neck sizes.

In the embodiment of FIGS. 1 to 4 there is a head strap 23 extending between the cords 18 to secure behind the head of a wearer. As shown in FIG. 3 the head strap 23 may be formed in two parts 24, one part extending from each cord 18 and attached to the cord by a simple attachment, for example by folding around the cord 18 and stitching or by a detachable joint. The head strap 23 is completed by mutually attachable strips 26, one on each strap part, one mutually attachable strip 26 being formed with eyes and the other with hook. Such attachments are commonly available under the trade mark Velcro.

To facilitate gripping of the ends of the strips they are desirably thickened at their ends 28.

To wear the attachment according to FIGS. 1 to 4 first the attachment is attached to the spectacles by slipping elasticated sleeves 16 over the ear pieces 14 of the glasses. The attached cords 18 then extend downwardly as shown in FIG. 1. Prior to placing the attachment over the head of the wearer the strips 26 are detached from each other.

The neck band 20 is placed over the head of the wearer with the loops 22 around the front, as shown in FIG. 2. The strips 26 are then attached to each other to attach the head strap around the head of the wearer, as shown in Figure 2, to provide a very secure attachment of the spectacles to the head.

The illustrated attachment may be varied. For example the anchors need not be elasticated sleeves. A simple loop that fits over the ear pieces and can receive retaining cords can also be used. Typically these loops are formed with a slip member which can be moved up the loop to press the anchor around the ear piece.

The neck band 20 can be replaced by a non-elastic neck band 30 formed with a slip ring 32 to vary the length of the neck band 30—see FIG. 4. Loop 33 prevents neck band 30 from passing completely through slip ring 32. Similarly the loops 22 can be replaced by clips that can be released from the neck band 20. This allows the neck band 22 to be used as a decorative neck band, separate from the rest of the attachment.

FIG. 5 illustrates a further embodiment of the invention. In this embodiment the head band 23 and the elasticated sleeve 16 are formed in one piece. A single retaining member in the form of cord 34 joins the head band 23 to the neck piece 20.

The cord 34 may be attached simply by looping around the head band 23 and the neck band 20 and stitching.

The present invention provides an attachment simple to make and easy to wear that can be made in decorative styles which nevertheless provides extremely positive attachment of the spectacles. It is unlikely that spectacles will be knocked from the head of a wearer because of the presence of the head strap 23 but should that happen the safety provided by the cords 18 and 34 and the neck band 20 offer greater security than in the prior art.

I claim:

1. An attachment to assist in holding spectacles on the head of a wearer, the spectacles having eye pieces and ear pieces, the attachment comprising:
   at least one anchor member to grip the ear pieces of the spectacles;
   a retaining member extending from said at least one anchor member;
   a neck band to be received around the neck of the wearer; and
   means attaching the retaining member to the neck band.

2. An attachment as claimed in claim 1 in which there are anchor members to grip each ear piece; and
   a retaining member extending from each anchor member to the neck band.

3. An attachment as claimed in claim 2 in which the anchor members are elasticated sleeves that grip the ear pieces.

4. An attachment as claimed in claim 1 in which the neck band is of variable length.

5. An attachment as claimed in claim 4 in which the neck band includes a slip ring to vary the length.

6. An attachment as claimed in claim 4 in which the neck band is elastic.

7. An attachment as claimed in claim 2 further including a head strap extending between the retaining members to secure behind the head of a wearer.

8. An attachment as claimed in claim 7 in which the head strap is formed in two parts, one part extending from each retaining member, and joinable at their distal end.

9. An attachment as claimed in claim 8 in which the two parts are joinable by mutually attachable strips, one on each strap part, one mutually attachable strip being formed with eyes, the other with hooks.

10. An attachment as claimed in claim 9 in which the strips are thickened at their ends to facilitate gripping.

11. An attachment as claimed in claim 1 in which there is one anchor member to grip both ear pieces; and
    a single retaining member extending from the anchor member to the neck band.

* * * * *